Aug. 4, 1959
R. W. ANSTINE
2,897,853
FILLING INDICATOR FOR UNDERGROUND TANKS
Filed Nov. 12, 1957
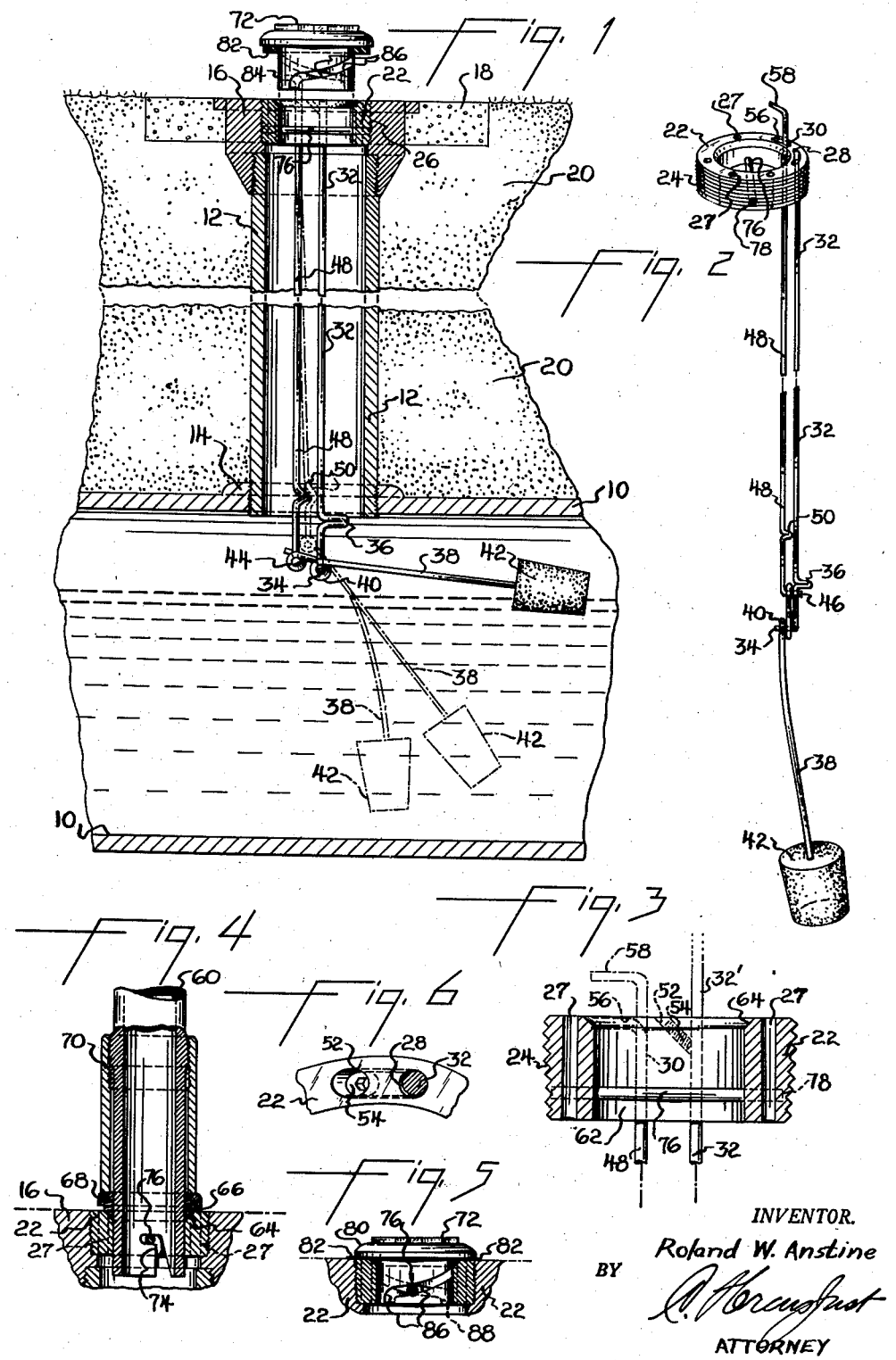
INVENTOR.
Roland W. Anstine
BY
ATTORNEY

United States Patent Office 2,897,853
Patented Aug. 4, 1959

2,897,853

FILLING INDICATOR FOR UNDERGROUND TANKS

Roland W. Anstine, York, Pa.

Application November 12, 1957, Serial No. 695,830

9 Claims. (Cl. 141—95)

This invention relates to improvements in a filling indicator assembly for use with underground tank installations and, more particularly, it is used to indicate the level of liquid with which said tanks are being filled, whereby as the liquid level in the tanks is nearing the top thereof, indication of this will be given to the person making the delivery. Without restriction thereto, the invention is very suitable for installation, on a substantially permanent basis, into a fuel tank mounted underground such as those used in connection with the storage of fuel oil, gasoline, and other similar liquids.

Many fuel oil storage tanks are used in industries, institutions, and residences, the same being positioned with a basement for example where the tank is visible and it is possible to install commonly used filling indicating means such as whistles operated by escaping air from the tank while being filled, and the like. However, when liquid storage tanks are installed within the ground, below the level thereof, and a fill pipe is required to extend through the ground from the top of the tank to a flush fitting connected to the upper end of the fill pipe, it is not practical to use filling signal or indicating means such as are commonly used with the tank described above which are mounted in open spaces in basements or other similar storage compartments. Frequently storage tanks installed below the ground surface are covered by lawns, driveways, and other surfaces which do not lend themselves readily to the use of such commonly employed signaling means. Hence, to provide a suitable signaling means in conjunction with underground storage tanks presents a number of different problems from those encountered in regard to installing conventionally used signaling means of the type referred to above.

It is the principal object of the present invention to provide a filling indicator for use with underground tanks which may be installed readily and quickly in tanks which have been mounted beneath the ground for extensive periods of time or which have been newly installed, no special mounting means other than those included with the invention being required, and the character and nature of the indicating means being especially designed so as to permit the same to be extended down a fill pipe with a float member disposed within the upper portion of the tank, the float member actuating a simple yet effective indicating member which is viewable readily by a deliveryman during the operation of filling the tank.

Another object of the invention is to provide a filling indicating assembly provided with means operable during the installation thereof within an underground tank and fill pipe, whereby the float lever of the assembly is accurately positioned a predetermined distance below the top of the tank, regardless of how far the tank is mounted below the surface of the ground, thereby rendering the indicator assembly substantially universally applicable to tanks mounted within a wide range of depths below the surface of the ground.

A further object of the invention is to provide a filling indicator comprising a minimum number of parts which are simple and inexpensive to produce and fabricate, and the installation of which within a submerged tank and fill pipe may be accomplished quickly and permanently with a very limited number of simple tools.

Still another object of the invention is to provide in said indicator assembly a simple and inexpensive threaded collar which comprises the sole supporting means for the other elements of the assembly, said collar also including means by which either a closure cap or a filling nozzle, interchangeably, may be connected thereto. Ancillary to this object, it is a further object to utilize bayonet slot and interengageable projecting means between the supporting collar, and selectively, the filling nozzle or closure cap, whereby such interconnection of either the nozzle or cap with the supporting collar takes place quickly and effectively.

Details of the foregoing objects and of the invention, as well as other objects thereof, are set forth in the following specification and illustrated in the accompanying drawing comprising a part thereof.

In the drawing:

Fig. 1 is an exemplary, vertical sectional view illustrating a typical tank for liquids installed within the ground below the upper surface thereof and also showing a fill pipe extending from the tank to the ground level. a filling indicator assembly embodying the principles of the present invention being mounted within said tank and fill pipe installation, this view being partly foreshortened to facilitate the illustration.

Fig. 2 is a perspective side elevation showing the filling indicator assembly comprising the present invention in condition to be inserted within the fill pipe of the tank installation shown in Fig. 1.

Fig. 3 is a vertical sectional elevation of the supporting collar shown in Figs. 1 and 2, the same being illustrated on a slightly larger scale for purposes of showing certain details thereof, and several of the elements supported by said collar being shown fragmentarily.

Fig. 4 is an exemplary, fragmentary vertical sectional elevation showing a typical connection of a filling nozzle with the supporting collar of the filling indicator assembly in accordance with the invention.

Fig. 5 is a view similar to Fig. 4 but showing a closure cap positioned within said collar rather than a filling nozzle as illustrated in Fig. 4.

Fig. 6 is a fragmentary top plan view of a portion of the supporting collar shown in Fig. 3.

Referring to the exemplary illustration of a typical installation of an underground tank shown therein, it is to be understood that the tank 10 may be of any desired size but, usually, at least the upper walls of said tanks usually are positioned substantially horizontally and the fill pipe 12 is threaded at its lower end into a threaded boss 14 in the top of the tank. The fill pipe 12 extends to a flush fitting 16, the upper end of the pipe 12 usually being threaded into said fitting as shown in said figure, and the fitting also usually being mounted in a durable cement header 18, even when such flush fittings 16 are positioned in a lawn for example. The illustration in Fig. 1 presupposes that the tank 10 is mounted in earth or ground 20, and the length of the fill pipe 12 may be as much as is required to extend between the fitting 16 and the tank 10, this distance frequently being anywhere from one or two feet, up to eight or ten feet.

When a deliveryman arrives to make a delivery of liquid such as fuel oil, gasoline, or the like, he readily may determine the amount of liquid in the tank at the commencement of a filling operation, simply by inserting a measuring stick into the fill pipe until it strikes the bottom of the tank. Then by pulling the stick up, he can ascertain, usually by a scale upon the stick, how much liquid is in the tank by observing the wet portion of the stick. However, determining when the tank is full is a more difficult matter, usually because most underground storage tanks are cylindrical and are mounted horizontally within the ground. Hence, as the liquid level begins to approach the top of the tank, the level of the liquid rapidly narrows as the tank becomes full due to the circular cross-section of the tank. Hence, it is not uncommon for tanks to overflow while being filled because of no ready means being available for tanks installed underground, whereby most filling operations today are undertaken largely upon a guess work basis.

The present invention comprises a simple filling indicator assembly shown in exemplary manner in Fig. 2. This assembly comprises a supporting collar 22 which may be formed by casting or otherwise from any suitable material such as cast iron, steel, bronze, or the like. The exterior of the collar 22 is provided preferably with pipe threads 24, whereby the collar may be fitted into a threaded internal opening 26 within flush fitting 16, coaxially of the fill pipe 12. This threaded opening 26 usually receives a conventional threaded cap, not shown. Hence, it is only necessary to thread the collar 22 into the threaded opening 26 of the flush fitting 16 until the threads 24 tighten with the internal threads of opening 26.

Supporting collar 22 is provided with a plurality of vent holes 27, as best shown in Fig. 2. These are circumferentially spaced around the collar and preferably are parallel to each other and the axis of the collar. The collar also is provided with a pair of mounting apertures 28 and 30 which are circumferentially spaced from each other and also are preferably parallel to each other and the axis of the collar 22. Mounting aperture 28 receives the upper end of elongated supporting rod 32 which may be formed from a suitable gauge of relatively stiff wire, preferably rendered non-corroding by galvanizing or otherwise. Such rod, for a typical assembly, is made in a suitable length of six or seven feet and the lower end thereof is bent at a right angle to the rod to comprise a pivot pintle 34. Spaced a predetermined distance above the lower end of rod 32 is a lateral projection 36 comprising positioning means engageable with the lower end of the fill pipe 12 for example, as shown in Fig. 1, when installing the assembly within the tank and fill pipe, as will be described in further detail hereinafter. The projecting member 36 conveniently may be formed simply by placing a reverse bend within the rod 32 as clearly shown in Fig. 1.

A float lever 38, formed preferably from flexible spring wire or the like, is provided near one end with a bearing loop 40 which is pivotally mounted upon the pintle 34. Mounted on the end of the longer portion of float lever 38 is a float member 42 which may be of any desired construction but sufficiently small so as to be readily extendable down fill pipe 12 while the assembly is being mounted within the tank installation. Conveniently, the float 42 may comprise a varnished or lacquered cork several inches long and slightly in excess of an inch in diameter, particularly where the fill pipe has an internal diameter of approximately two inches. The other end of float lever 38 is provided with another bearing loop, to which a pintle 46 on the lower end of indicator rod 48 extends as shown in Figs. 1 and 2.

Indicator rod 48 may be formed from wire or other material similar to that from which supporting rod 32 is formed and said indicator rod is substantially coextensive in length with supporting rod 32. The upper end of the supporting rod 32 extends through mounting aperture 30, as shown in Figs. 2 and 3. Near the lower end of indicator rod is a lateral projection 50 which extends transversely thereof toward the supporting rod 32 and is adapted to abut the same, as shown in dotted lines in Fig. 1, when the float and float lever extend downwardly as shown in Fig. 1 in dotted lines, this being the position thereof when the tank is nearly empty, as well as when the indicator assembly is being mounted within the tank and fill pipe initially. The abutment of projection 50 with supporting rod 32 will prevent the float lever 38 from assuming a dead-center position during such assembly by insertion of the float end of the assembly down the fill pipe 12 and into the tank 10. Even though the projection 50 may tend to hold the float 42 farther in a lateral position than is desired during the insertion thereof down the fill pipe 12, the flexibility of the float lever 34 permits bending of the same to dispose the float 42 more in line with the other members of the assembly during such insertion of the same down the fill pipe 12, whereby such insertion is not impeded. Such bent position of the float lever 38 is shown in the left-hand dotted line position of Fig. 1.

By referring to Figs. 3 and 6 particularly, it will be seen that the upper end of supporting collar 22 is provided with a diagonally extending threaded hole 52 adjacent mounting aperture 28 and communicating therewith, to receive a set screw 54, of the Allen type for example. Also, the upper end of mounting aperture 30 terminates in a horizontally extending, short recess 56 formed in the upper surface of the collar. An assembly to be installed within a tank installation is extended somewhat as shown in Fig. 2 and the float end thereof is projected down the fill pipe 12 as described hereinabove. While the installer holds the upper ends of the rods 32 and 48 which extend through the collar 22, the collar 22 is threaded into position within the flush fitting 16 until tight. Then, the supporting rod 32 is projected the full length of fill pipe 12 until projecting member 36 extends past the lower end of fill pipe 12. Rod 32 is then retracted upwardly until projecting member 36 engages the end of the fill pipe and set screw 54 then is tightened against rod 32, the excess projecting end 32' then being cut off flush with the top of collar 22 by a pair of nippers or the like.

Indicator rod 48, which also projects above the collar 22 during this operation, now is depressed until it can be felt that the float 42 engages the top of the tank 10. The upper end of rod 48 then is elevated a short distance such as about one-half inch or possibly less, and a mark is made upon the rod 48 adjacent the top of collar 22. Then the weight of the float 42 is permitted to elevate rod 48 still further and rod 48 is bent at the mark made thereupon into a right angled projection 58, the excess portion of the rod being cut therefrom to leave said projection about one-quarter inch long, the same fitting within the recess 56 of collar 22 when depressed thereinto or when the liquid within the tank is filled to within a few inches of the top of the tank, whereby the float 42 assumes the position shown in full lines in Fig. 1, it being understood that this illustration is only exemplary. This completes the installation of the assembly.

The present invention also encompasses means for attaching selectively either a filling nozzle or a closure cap to the upper end of the installation of the filling indicator assembly with the fill pipe 12. The attachment of a filling nozzle such as used on the end of a hose of a delivery tank truck for example, is shown in Fig. 4, while the attachment of a closure cap is illustrated in Fig. 5. Referring to Fig. 4, it will be seen that the fragmentarily illustrated outer end of a filling nozzle 60 is inserted telescopically within the central opening of supporting collar 22. It also will be noted that the upper end of central opening 62 of collar 22 is chamfered at 64 as shown best in Fig. 3. Referring now to Fig. 4, it will be seen that said chamfer forms a seat for a gasket 66, formed from synthetic rubber or the like, and surrounding filling nozzle 60.

The upper edge of gasket 66 is engaged by an annularly recessed ring 68 which receives the upper end of gasket 66. Threaded upon the exterior of filling nozzle 60 is a rotatable clamping sleeve 70, the lower end of which abuts ring 68 as shown in Fig. 4.

Interengaging bayonet slot means and projection means are utilized to connect either the filling nozzle 60 or the closure cap 72 selectively to the supporting collar 22. For purposes of simplicity, it is preferred that a pair of diametrically opposite bayonet slots 74 be formed so as to extend inwardly from the outer end of filling nozzle 60, as shown in Fig. 4. A simple form of projecting means comprises a transverse pin 76 which effectively is mounted within collar 22 by inserting the same through a pair of diametrically opposite holes 78, as best shown in Figs. 2 and 3. It is not necessary to secure pin 76 within the hole 78 too firmly because when the collar 22 is positioned within flush fitting 16, the pin can not escape.

When the nozzle 60 is connected to the collar 22, in the manner illustrated for example in Fig. 4, and the bayonet slots 74 have engaged the pin 76, it is only necessary to rotate the clamping sleeve 70 a few turns in order to clamp the gasket 66 effectively against chamfer 64 upon collar 22. The gasket 66 preferably is sufficiently narrow that it will not obstruct the vent holes 28 as is shown in Fig. 4. Neither will the gasket interfere with the upper end 58 of indicating rod 48. Assuming that the tank 10 is nearly empty, the float 42 will depend from the lower end of supporting rod 32 so that it extends somewhat as indicated in the intermediate dotted line position of Fig. 1. When in this position, the indicating end 58 of rod 48 will be projected as shown in dotted lines in Fig. 3 and also in full lines in Fig. 2. Filling of the tank continues until the level of the liquid becomes such that it raises the float to the full line position shown in Fig. 1 for example, whereupon the indicating end 58 of rod 48 is retracted into recess 56, thereby indicating to the deliveryman that the tank substantially is full, or at least is full for all practical purposes and only a slight amount of additional space remains to be filled. When this occurs, the filling nozzle 60 quickly is removed from the collar 22 simply by unscrewing clamping sleeve 70 to release gasket 66 and thereby permit the filling nozzle 60 to be rotated axially to disconnect the bayonet slots 74 from the transverse pin 76. In this situation, the top of supporting collar 22 is clear of any obstructions, including the indicating end 58 of rod 48.

The collar 22 now is in condition to receive closure cap 72 which, as shown in Figs. 1 and 5, comprises an outer flange 80 which is at least coextensive with the outer diameter of collar 22, as shown in Fig. 5. A sealing gasket 82 which is preferably compressible, such as synthetic rubber or the like, is disposed against the lower face of flange 80 and surrounds a cylindrical flange 84 which extends axially of cap 72, as best shown in Fig. 1. Flange 84 is provided with a plurality of diametrically positioned bayonet slots 86 which receive the traverse pins 76 of collar 22, as shown in Fig. 5. The projections 88 defining the lower ends of bayonet slots 86 preferably extend upwardly a slight distance to provide a locking dwell portion in the slots adjacent the outer ends thereof and within which the pin 76 is disposed as shown in Fig. 5, in cap-locking position. The compressibility of gasket 82 permits this locking function to take place, whereupon the cap 72 is securely positioned disengageably locked to the collar 22. To facilitate operation of the cap 72, the upper surface thereof may be provided with a star, or other similar projecting arrangement which may be engaged by a wrench or other tool, as conventionally used in operating caps of this type.

When the cap 72 is secured in locked position as shown in Fig. 5, even though the level of the liquid within the tank may be lowered, as by use thereof, the cap 72 and especially the flange 80 thereof will retain the indicating end 58 of rod 48 depressed within recess 56. Further, the flange 80 will cover the vent holes 27 of collar 22, whereby no extraneous material may fall into the tank or fill pipe 12.

From the foregoing, it will be seen that the present invention provides a simple and effective filling indicator assembly which quickly may be installed within the fill pipe of an underground tank installation, whereby the overflowing of such tank can be prevented by a deliveryman observing the indicating end 58 of the assembly as it is actuated by float 42 during the filling of the tank. The invention also includes simple and effective means for tightly securing a delivery nozzle to the collar 22 of the indicator assembly, sealing gasket means being provided to prevent spillage or leakage of the liquid being delivered to the tank when the filling nozzle is secured as intended in accordance with the principles of the invention. The securing of the nozzle to the collar 22 is effected quickly, thereby speeding up delivery time. Disengagement of the nozzle from the collar is achieved with equal facility, following which a closure cap, utilizing the same connecting means as the filling nozzle, may be mounted in closing position.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A filling indicator assembly for a tank installed beneath the surface of the ground and having a fill pipe extending upwardly from the filling opening in the top of the tank to a flush fitting at the surface of the ground, said indicator assembly comprising in combination, an annular supporting collar connectable to the interior of said flush fitting coaxially with said fill pipe and the opening in said collar being of a size to receive a filling nozzle of fluid delivery means, an elongated supporting rod adjustably extendable and supportable within said fill pipe longitudinally, means to secure said upper end of said supporting rod to said collar in a predetermined position relative thereto, a float lever pivotally connected adjacent one end thereof to the lower end of said supporting rod and having a float on the longer end thereof, an elongated indicator rod pivotally connected at the lower end thereof to said float lever a short distance from the pivotal connection of said lever to said supporting rod and arranged to extend upwardly through said fill pipe and slidably relative to said collar, whereby the movement of the upper end of said indicator rod relative to said collar when the liquid level reaches said float indicates said situation, and positioning means projecting laterally from said supporting rod a predetermined distance above the pivot thereon for said float lever and operable to engage the lower end of said fill pipe when positioning said assembly therein to determine the operable range of positions of the float relative to the upper surface of the tank, whereby when the liquid with which the tank is being filled reaches the float when in fullest depending position further filling will elevate said float and raise the upper end of said indicator rod relative to said collar to afford visual indication of the extent to which the tank has been filled.

2. The filling indicator assembly set forth in claim 1 further including projecting means on one of said rods near the lower end thereof and directed laterally toward the other rod, whereby when said assembly is being installed within a tank and fill pipe thereof and the float lever is in depending position said projecting means will abut the other rod and prevent the float lever from being on dead center of the line of its pivot when installed within said tank.

3. The filling indicator assembly set forth in claim 1 further characterized by said collar having a plurality of apertures extending through the wall thereof parallelly to each other and the axis of said collar, the upper end of said supporting rod extending through one of said apertures adjustably and the upper end of the indicator rod being slidable within another of said apertures, and securing means comprising a set screw threaded into said collar and engageable with said supporting rod to lock the same to said collar, whereby any excess projecting portion of said rod above said collar following installation thereof may be cut off to complete such installation.

4. A filling indicator assembly for a tank installed beneath the surface of the ground and having a fill pipe extending upwardly from the filling opening in the top of the tank to an internally threaded flush fitting at the surface of the ground, said indicator assembly comprising an annular supporting collar threadably connectable to the interior of said flush fitting coaxially with said fill pipe and provided with vent hole means extending substantially parallel to the axis of said collar, an elongated supporting rod connected to the lower end of said supporting rod and having a float on one end thereof, and an elongated indicator rod pivotally connected at the lower end thereof to the other end of said float lever and arranged to extend upwardly through said fill pipe and slidably movable through an aperture in said collar, in combination with a filling nozzle for the outer end of a delivery hose of a tank delivery vehicle arranged to be inserted axially within said collar, interconnectable bayonet slot means and projecting means on said collar and nozzle operable to connect the same detachably, a sealing gasket surrounding said nozzle and engageable with said collar, and gasket compressing means movable upon said nozzle against said gasket and operable to compress the same against said collar to prevent leakage of liquid delivered by said nozzle to said tank, said vent holes in said collar being offset from said gasket when engaging said collar and permitting the escape of air from said tank while being filled.

5. A filling indicator assembly for a tank installed beneath the surface of the ground and having a fill pipe extending upwardly from the filling opening in the top of the tank to a flush fitting at the surface of the ground, said indicator assembly comprising in combination, an annular supporting collar connectable to the interior of said flush fitting coaxially with said fill pipe, an elongated supporting rod connected at the upper end thereof by said collar, a float lever pivotally connected to the lower end of said supporting rod and having a float on one end thereof, and an elongated indicator rod pivotally connected at the lower end thereof to the other end of said float lever and arranged to extend upwardly through said fill pipe and slidably movable through an aperture in said collar, said collar being arranged axially to receive a filling nozzle on the outer end of a hose of a tank delivery vehicle which is to be detachably connected to said collar by inter-connectable bayonet slot means and projecting means, one of said connecting means being carried by said collar.

6. The filling indicator assembly set forth in claim 5 further characterized by said nozzle connecting means carried by said collar comprising a pin extending substantially diametrically across said collar and arranged to be received by bayonet slots in said nozzle for disengageable connection of said nozzle and collar, said pin also comprising manipulating means facilitating the threadable securing of said collar within said flush fitting.

7. A filling indicator assembly for a tank mounted beneath the surface of the ground and having a fill pipe extending upwardly from the filling opening in the top of the tank to a flush fitting at the surface of the ground, said indicator assembly comprising in combination, an annular supporting collar connectable to the interior of said flush fitting coaxially with said fill pipe, said collar having an aperture extending through the wall thereof parallelly to the axis of said collar, an elongated supporting rod connected at the upper end to said collar, a float lever pivotally connected to the lower end of said supporting rod and having a float on one end thereof, an elongated indicator rod pivotally connected at the lower end thereof to said float lever and arranged to extend upwardly through said fill pipe and slidably through said aperture of said collar, whereby when the liquid within said tank reaches said float said float lever will be moved to elevate said indicator rod and project the upper end thereof above said collar, a closure cap for the upper end of said fill pipe arranged to be disposed over the upper end of said collar, and bayonet slot means and interengaging projection means on said cap and collar operable to secure said cap releasably to said collar, said cap depressing the upper end of said indicator rod into said collar when said cap is connected to said collar.

8. The filling indicator assembly set forth in claim 7 further characterized by said cap having a cylindrical flange depending therefrom and positionable within said collar when said cap is connected thereto, said bayonet slot means being formed within said flange, and a locking pin extending across said collar and comprising the projecting means engaged by said bayonet slot means of said flange.

9. The filling indicator assembly set forth in claim 7 further characterized by said collar having vent holes extending through the walls thereof and operable to permit the escape of air from said tank while being filled and said cap having a peripheral flange thereon at least coextensive with said collar when connected thereto and covering said vent holes in said collar when connected thereto.

References Cited in the file of this patent

UNITED STATES PATENTS

| 1,768,946 | Anschicks | July 1, 1930 |
| 2,058,061 | Clinch | Oct. 20, 1936 |
| 2,377,330 | Dixon | June 5, 1945 |